3,304,249
METHOD OF STABILIZING A FLUIDIZED BED USING A GLOW DISCHARGE
Herbert Katz, Port Jefferson, N.Y., assignor to the United States of America as represented by the United States Atomic Energy Commission
No Drawing. Filed Feb. 28, 1964, Ser. No. 348,920
4 Claims. (Cl. 204—164)

This invention is related to a method and apparatus for carrying out processes in fluidized bed type reactors. More particularly it relates to a method and apparatus in which chemical processes and reactions can be carried out in fluidized beds with greater efficiency, a greater through-put of reactants and economy by the application of an electrical charge to the particulate matter making up the bed.

The fluidized bed as it is called, results when a fluid, usually a gas, flows upward through a bed of suitably sized, solid particles at a velocity sufficiently high to buoy the particles, to overcome the influence of gravity, and to impart to them an appearance of great turbulence, similar to that of a violently boiling liquid. Fluid velocities must be intermediate between that which would lift the particles to maintain a uniform suspension and that which would sweep the particles out of the container.

During the fluidization of the bed there is excellent contact between the solid particles and the gaseous fluidizing medium; and if there is a temperature difference, there is an excellent flow of heat between the particles and the gas. Thus equilization of temperature is rapidly accomplished. Similarly, there is a major opportunity for mass transfer to or from the solid particles and between the solid particles and the gas phase, as in the movement of reactants in the fluid phase toward the surface of solid particulate catalysts and the reverse movements of the products away from the catalytic surface back to the body of the fluid phase.

Thus with such exellent opportunities for heat and mass transfer to or from solids and fluids, fluidized beds have become a major tool in such fields as drying, roasting and other processes involving chemical decomposition by heat. An important application has been in the catalysis of gas reactions wherein the excellent opportunity of heat transfer and mass transfer between the catalytic surface and the gas stream gives performance unequaled by any other system. Many other chemical processes have utilized the fluid bed system, e.g., the catalytic conversion of naphthalene to phthallic anhydride.

Conventional fluid bed reactors have inherent limits as to the amount of fluid that may be passed through the bed which limits have heretofore limited the use of fluid beds in many catalytic processes. When fluid velocities are too high the particles are lifted out of the container thus the throughput of the fluid through the bed is limited by the size of the bed and the bed container. If the fluid velocity is too low, the capacity of the bed is limited. To increase the fluid throughput others in the art have resorted to larger and higher bed containers which are high in cost.

Another limiting factor in the use of fluid beds has been attrition of the particles making up the beds. This attrition is a result of the high degree of turbulence found in conventional beds. The attrition is greatly accelerated when slugging is present. As the particles are worn down by the intercollisions with each other as a result of the turbulence and/or slugging they lose weight and are subject to being carried out of the bed by fluid as fines. Many conventional systems must provide costly recovery systems to recover such attrition produced fines. Further, many catalysts are so pulverulent that the turbulence and/or slugging found in conventional fluid beds prevents their use in fluidized bed processes.

It is an object of this invention to provide those skilled in the art with a highly efficient economical apparatus and method for stabilizing fluid bed processes wherein the conventional slugging effect resulting from too high a fluid velocity through the bed is sharply reduced.

It is another object of this invention to provide those skilled in the art with a method and apparatus for stabilizing the fluid beds wherein the degree of bed expansion is controlled to a high degree by forces other than the velocity of the fluid through the bed.

It is another object of this invention to provide those skilled in the art with a method and apparatus for maintaining equal interstitial distances between the particles of a fluidized bed.

It is a further object of this invention to provide those skilled in the art with a method and apparatus to sharply reduce the rate of particulate attrition of the particles in a fluidized bed resuling from the turbulence of the particles in a fluidized bed.

Other objects of this invention will in part be obvious and will in part appear hereinafter.

It has unexpectedly been discovered that fluidized beds contained in a vessel having a bed made up of fluidizable particulate solids, which solids have a moderate surface electroconductivity, fluidized by a gaseous fluidizing medium can be readily stabilized by a process in which a high voltage is applied to the fluidizing medium in an amount sufficient to ionize at least a portion of the fluidizing medium and creating an electrical field throughout the bed; contacting the fluidized solids in the electrical field with the charged particles resulting from the ionization of the gaseous medium. The voltage should be applied in an amount which is sufficient to effect a corona discharge in at least a portion of the fluidized bed. It has further been discovered that my novel process can readily be carried out in a fluidized bed reactor having a vessel for containing the bed, a bed made up of fluidizable particulate solids having a moderate surface electroconductivity, a gaseous bed fluidizing medium, means for generating high voltage, at least two electrodes spaced in a capacitative relationship operatively connected to the high voltage generating means wherein at least a portion of the bed is between the space defined by said electrodes, the generating means being capable of passing a voltage through the electrodes sufficient to ionize at least a portion of the fluidizing medium and create an electrical field throughout the bed. The voltage being at least sufficient to form a corona discharge of the gas making up the fluidizing medium. By a stabilized fluidized bed I mean an expanded fluidized bed of particulate solids in which the turbulent motion of the solids and slugging effects produced by the growth of gas bubbles found in conventional fluidized beds can be completely suppressed and that the uniformly expanded particulate solids making up the fluidized stabilized beds of my invention have greatly increased gas throughput capacity with no increase in pressure drop or slugging.

By the term fluidizable particulate solids having a moderate surface conductivity for the purposes of defining this invention, I mean particulate solids of a size and shape capable of being fluidized in conventional fluid beds with the added advantage that very fine particles which ordinarily would be ejected from conventional systems may be maintained as a portion within my stabilized bed. For the purpose of this invention I define the term moderate surface electroconductivity as applied to the particulate solids making up the stabilized beds of my invention as meaning solids having a surface electroconductivity intermediate between particulate solids having a low surface conductivity such as polystyrene particles and particulate solids having a high surface conductivity such as metallic particles, e.g., zinc particles. As is well known to those skilled in the art the surface conductivity of particulate solids is subject to variation due to impurities on the particles, geometric configuration, size, etc. The applicability of a particular bed material for use in my invention may readily be ascertained by one skilled in the art by a simple experiment such as that shown in Example I of this invention. Exemplary of fluidizable particulate solids that I have found to be usable in my invention are metallic oxides, e.g., aluminum oxide, uranium oxide, magnesium oxide and sand; inorganic salts, e.g., sodium chloride, potassium chloride, sodium tungstate and potassium permanganate; organic materials, e.g., B naphthol salicylic acid and sugar.

The fluidized medium found usable in my novel process can be any gas or mixture of gases having sufficient dielectric strength to sustain the electrical field necessary to stabilize the bed. Gases such as argon which have low ionizing potentials in an order of magnitude such that it is impossible to pass a high voltage through a stream of such gases to form a corona discharge because of arcing in the system can be quenched by the addition of a quenching agent such as methane in order that a corona discharge can be formed in such a gaseous stream. The use of such quenching agents are well known to those skilled in the art. Arcing in the system is to be avoided in order that the fluidized bed solids can more efficiently be contacted with unipolar particles resulting from the ionization of the fluidizing medium during the operation of my novel process. Arcing in the system because of a low ionizing potential of the gaseous fluidizing medium can also be overcome by pressurizing the system, which also increases the throughput of the system. The fluidizing medium can be a reactant which is to be reacted with or reacted upon by the bed solids and it can even be a mixture of reactant gas and a fluidizing carrying gas.

The vessels found usable in my novel invention to contain the fluidized particulate solids can be of any type, size, shape and composition which are employed in conventional fluidized bed operations. In essence the vessel must be large enough to contain the bed solids, have means for the ingress and egress of the fluidizing medium and be capable of accommodating the electrodes.

Any conventional high voltage generating means can be employed in the practice of my invention. My invention is not limited to the use of either A.C. or D.C. or unidirectional current to produce the high voltage in the electrodes as it works well with either type of current. However, in the preferred embodiment of my invention, I use high D.C. voltage in the electrodes because the use of such type of current provides greater stability to the bed.

The electrodes usable in my invention can be made of any of the conventional materials employed in making electrodes, however care should be taken to choose materials which will not be damaged by the reactants which they will come in contact with during operation of the process. Since the function of the electrodes is to create an electric field, corona effect, sufficient to ionize at least a portion of the gaseous fluidizing medium the electrodes should be of a shape and configuration to produce such effects. A portion of the bed particles must flow between the electrodes in order that an electrical discharge field is present in the bed. Sufficient voltage must be passed through the electrodes to ionize the fluidizing medium and create a corona effect but arcing in the system must be avoided.

The following examples are given merely to illustrate the practice of my invention:

*Example I*

In this example a cylindrically shaped pyrex glass fluidized bed reactor vessel having a length of 15 inches and width of 5¼ inches was used. The base of the vessel contained a three inch layer of tightly packed 25–35 mesh glass beads held fixedly in place in the vessel by a fine wire mesh screen. The bottom of the vessel was flanged to a reservoir of nitrogen and the tightly packed layer of beads was employed to ensure an even distribution of gas throughout the vessel during the course of this example. A ⅛-inch brass rod having a tapered point at one end was fixedly centered in the top end of the vessel with the pointed end of the rod being located approximately 7 inches above the screen covering the tightly packed layer of glass beads. The other end of the brass rod was connected to a high voltage D.C. power supply. The screen in the vessel was connected to ground.

A 3.3-inch layer of 50–60 mesh (approximately 0.274 mm. diameter) glass beads was placed in the vessel on top of the screen. This was utilized as the fluidized bed material.

At the outset nitrogen was bled into the base of the vessel without the application of any current to the brass rod to ascertain the fluidization of the bed under conventional operation. The bed was completely fluidized when the flow of nitrogen through the bed was approximately 2.4 ft.$^3$/minute.

The flow rate of the nitrogen was increased to approximately 2.7 ft.$^3$/min. and a negative voltage of 60,000 volts was applied to the brass rod and it was observed that immediately upon the application of this voltage to the brass rod that the glass beads making up the fluidized bed portion of the system became stationary while the bed remained expanded. It was further found that the voltage could be reduced to 24,000 volts before the bed particles resumed their movement.

In another experiment the flow rate of nitrogen was increased to approximately 3.6 ft.$^3$/min. and a negative voltage of 100,000 volts was applied to the brass rod. Upon application of this voltage it was observed that the fluidized glass beads making up the fluidized bed portion of the system became stationary, while the bed remained expanded. It was further found that the voltage could be reduced to 37,000 volts before the bed particles resumed their movement.

*Example II*

In this example a cylindrically shaped Pyrex glass fluidample I were employed except that the bed height was initially 1.5 inches at the outset. Nitrogen was passed through the bed at a rate of approximately 5.0 ft.$^3$/min. and a negative voltage of 82,000 volts was applied to the brass rod. Upon application of this voltage to the rod it was observed that the glass beads making up the fluidized bed portion of the system became stationary while the bed remained expanded. It was further found that the voltage could be reduced to 58,000 volts before the bed particles resumed their movement.

It is obvious from the disclosure given above that my invention provides operators of fluidized bed processes with many advantages, such as reducing catalyst losses produced by the frictional attrition of catalytic bed particles, which losses are present when conventional fluidized bed processes are employed. Further, my novel process and apparatus provide users of fluidized beds with a means of obtaining much greater throughput and more uniform contact of gaseous fluidizing medium to particle contact without significant increase in operational costs. It must be borne in mind that while my process makes use of high voltage, it uses very little current to achieve its beneficial effects, thus the cost of electrical power to stabilize the bed is relatively insignificant in comparison to the benefits achieved.

Having described my invention, what I claim as new and desire to secure by Letters Patent is:

1. A process for producing stabilized fluidized beds in a vessel having a fluidized bed made up of particulate solids, which solids have a moderate surface electroconductivity and are fluidized in the vessel by a gaseous fluidizing medium having a sufficiently high ionization potential to provide a corona discharge without arcing comprising applying a high voltage to at least a portion of the bed in an amount sufficient to cause a corona discharge in said fluidized bed.

2. The process of claim 1 wherein said high voltage is unidirectional.

3. A process for producing stabilized fluidized beds in a vessel having a fluidized bed made up of particulate solids, which solids have a moderate surface electroconductivity and are fluidized in the vessel by a gaseous fluidizing medium having a sufficiently high ionization potential to provide a corona discharge without arcing comprising, applying a high voltage to the fluidizing medium and the bed in an amount sufficient to ionize at least a portion of the gaseous fluidizing medium and create an electrical field throughout the bed.

4. The process of claim 1 wherein said high voltage is unidirectional.

No references cited.

JOHN H. MACK, *Primary Examiner.*

R. K. MIHALEK, *Assistant Examiner.*